US010435079B2

United States Patent
Fukuoka

(10) Patent No.: US 10,435,079 B2
(45) Date of Patent: Oct. 8, 2019

(54) VEHICLE FRONT STRUCTURE AND SEALING METHOD

(71) Applicant: TOYOTA JIDOSHA KABUSHIKI KAISHA, Toyota-shi (JP)

(72) Inventor: Takahiro Fukuoka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 62 days.

(21) Appl. No.: 15/902,598

(22) Filed: Feb. 22, 2018

(65) Prior Publication Data
US 2018/0244320 A1 Aug. 30, 2018

(51) Int. Cl.
| | |
|---|---|
| *B62D 25/16* | (2006.01) |
| *B62D 25/08* | (2006.01) |
| *B62D 21/11* | (2006.01) |
| *B62D 21/15* | (2006.01) |

(52) U.S. Cl.
CPC ............ *B62D 25/165* (2013.01); *B62D 21/11* (2013.01); *B62D 21/152* (2013.01); *B62D 25/082* (2013.01); *B62D 25/088* (2013.01); *B62D 25/084* (2013.01)

(58) Field of Classification Search
CPC .... B62D 21/11; B62D 21/152; B62D 25/082; B62D 25/088; B62D 25/165; B62D 65/02
USPC .................................. 296/30, 193.09, 203.02
See application file for complete search history.

(56) References Cited

U.S. PATENT DOCUMENTS

| | | | | |
|---|---|---|---|---|
| 5,024,482 A | * | 6/1991 | Isukimi | B60G 7/00 280/124.125 |
| 5,031,958 A | * | 7/1991 | Fujita | B62D 25/082 180/89.1 |
| 5,244,248 A | * | 9/1993 | Bovellan | B62D 21/152 296/187.09 |
| 5,267,630 A | * | 12/1993 | Watanabe | B60G 15/067 180/297 |
| 6,773,057 B2 | * | 8/2004 | Nomura | B62D 25/082 280/788 |
| 8,899,662 B2 | * | 12/2014 | Kido | B62D 25/088 296/187.09 |

(Continued)

FOREIGN PATENT DOCUMENTS

| | | |
|---|---|---|
| JP | 61-205871 U | 12/1986 |
| JP | 3-40171 U | 4/1991 |

(Continued)

*Primary Examiner* — Jason S Daniels
(74) *Attorney, Agent, or Firm* — Oblon, McClelland, Maier & Neustadt, L.L.P.

(57) ABSTRACT

A vehicle front structure includes an apron upper member extending in a vehicle front-rear direction, a suspension tower fixed to an inner side of the apron upper member in the vehicle width direction, and a plate-shaped reinforcing member covering at least part of an upper surface of the apron upper member and at least part of an upper surface of the suspension tower on the outer side. In the upper surface of the apron upper member, a step part is provided, wherein the outer side of the step part is higher than the inner side of the step part in the vehicle width direction. Molten sealer is injected between the step part and the outer edge when filling sealer between the apron upper member and the reinforcing member. Then, flow of the molten sealer to the outer side in the vehicle width direction is blocked by the step part.

7 Claims, 3 Drawing Sheets

(56) References Cited

U.S. PATENT DOCUMENTS

2016/0244097 A1   8/2016  Kondo et al.
2019/0039652 A1*  2/2019  Kamei .................. B62D 21/03

FOREIGN PATENT DOCUMENTS

JP        2016-68631      5/2016
JP        2016-150719     8/2016

* cited by examiner

VEHICLE FRONT STRUCTURE AND SEALING METHOD

INCORPORATION BY REFERENCE

The disclosure of Japanese Patent Application No. 2017-033274 filed on Feb. 24, 2017 including the specification, drawings and abstract is incorporated herein by reference in its entirety.

BACKGROUND

1. Technical Field

The disclosure relates to a vehicle front structure and a sealing method.

2. Description of Related Art

A vehicle front structure described in Japanese Utility Model Application Publication No. 61-205871 (JP 61-205871 U) includes an apron upper member that extends from a front pillar towards a vehicle front side. On an inner side of the apron upper member in a vehicle width direction, a suspension tower is fixed which supports a suspension and so on from a vehicle upper side. A plate-shaped reinforcing member covers an area from a part of an upper surface of the apron upper member on the inner side in the vehicle width direction through a part of an upper member of the suspension tower on an outer side in the vehicle width direction.

SUMMARY

In a structure like the vehicle front structure described JP 61-205871 U, it is preferred that sealer is filled without a gap between a lower surface of the reinforcing member and the upper surface of the apron upper member so that, for example, rainwater and so on do not enter between the reinforcing member and the apron upper member. However, depending on shapes and so on of the reinforcing member, the apron upper member, and other peripheral structures, when filling sealer between the lower surface of the reinforcing member and the upper surface of the apron upper member, there are instances where the sealer cannot be filled between them appropriately. Therefore, sealability between the lower surface of the reinforcing member and the upper surface of the apron upper member can be insufficient.

A vehicle front structure according to a first aspect of the disclosure includes: an apron upper member extending to a front side from a rear side in a vehicle front-rear direction in a vehicle front portion, an upper surface of the apron upper member including a first surface along an extending direction of the apron upper member, a second surface adjacent to the first surface located closer to a center of a vehicle in a vehicle width direction, and a third surface, a height of the second surface being lower than a height of the first surface, the third surface connecting an inner end of the first surface in the vehicle width direction and an outer end of the second surface in the vehicle width direction; a suspension tower positioned closer to the center of the vehicle than the apron upper member in the vehicle width direction, and the suspension tower being fixed to the apron upper member; a reinforcing member that is plate-shaped, the reinforcing member covering at least part of the second surface and at least part of the upper surface of the suspension tower; and sealer that is filled between the apron upper member and the reinforcing member.

In the above aspect, an outer end of the reinforcing member in the vehicle width direction may extend along a boundary between the first surface and the second surface.

In the above aspect, the sealer may be filled between the second surface and the reinforcing member.

According to the above aspect, a step part is formed by the first surface and the second surface on the apron upper member. In a manufacturing process of the vehicle front structure, when filling molten sealer between the upper surface of the apron upper member and the lower surface of the reinforcing member, the sealer is injected between the step part of the apron upper member and the edge of the reinforcing member on the outer side in the vehicle width direction. In that case, flow of the sealer to the outer side in the vehicle width direction is blocked by the step part. Therefore, the sealer flows towards the inner side in the vehicle width direction and is thus easily filled between the upper surface of the apron upper member and the lower surface of the reinforcing member. As a result, the vehicle front structure having the foregoing configuration is able to prevent insufficient sealability of a gap between the lower surface of the reinforcing member and the upper surface of the apron upper member.

In the above aspect, the vehicle front structure may include a fender panel that is plate-shaped, a part of the fender panel being positioned further from the center of the vehicle than the apron upper member in the vehicle width direction. The fender panel may be curved so that an upper portion of the fender panel is directed towards the center of the vehicle in the vehicle width direction, and an inner end of the fender panel in the vehicle width direction may be positioned above the apron upper member and closer to the center of the vehicle than the first surface in the vehicle width direction.

When filling the sealer between the upper surface of the apron upper member and the lower surface of the reinforcing member, it is considered to inject the sealer from a distal end of a tubular sealer gun. Also, when the sealer gun is used as stated above, it is preferred that the distal end of the sealer gun is directed towards the inner side in the vehicle width direction so that the sealer injected from the sealer gun easily flows toward the inner side in the vehicle width direction.

In the above aspect, the end portion of the fender panel on the inner side in the vehicle width direction is positioned on the inner side of the step part of the apron upper member in the vehicle width direction. Therefore, even if one attempts to direct the distal end of the sealer gun towards the inner side in the vehicle width direction, a part of the sealer gun on its base end side interferes with the fender panel, the distal end of the sealer gun may not be directed towards the inner side in the vehicle width direction. Thus, in a structure which includes the fender panel, filling of the sealer between the upper surface of the apron upper member and the lower surface of the reinforcing member is difficult.

According to the above aspect, however, flow of the sealer to the outer side in the vehicle width direction is blocked by the step part even if the sealer is injected from the sealer gun of which the distal end do not toward the inner side (for example, the distal end towards the outer side,) in the vehicle width direction. Therefore, sealability of a gap between the lower surface of the reinforcing member and the upper surface of the apron upper member is ensured more reliable.

In the above aspect, the apron upper member may include a tubular linear part, which linearly extends from the rear side to the front side in the vehicle front-rear direction, and a tubular curved part, which curves and extends from a front end of the linear part, and the first surface and the second surface extend in an entire region of the linear part along an extending direction of the linear part.

According to the above aspect, the step part is provided in the entire region of the linear part of the apron upper member. Because of this, a ridgeline is formed, which extends throughout the entire region of the linear part in its extending direction. Existence of the ridgeline makes it less likely that a sectional shape of the tubular linear part is collapsed and thereby improving rigidity against a load from a vehicle front side.

A sealing method according to a second aspect of the disclosure includes filling molten sealer, for a vehicle front structure, between an apron upper member and a reinforcing member, the vehicle front structure including: filling molten sealer, for a vehicle front structure, between an apron upper member and a reinforcing member, the vehicle front structure including: the apron upper member extending to a front side from a rear side in a vehicle front-rear direction in a vehicle front portion, an upper surface of the apron upper member including a first surface along an extending direction of the apron upper member, a second surface adjacent to the first surface located closer to a center of a vehicle in a vehicle width direction, and a third surface, a height of the second surface being lower than a height of the first surface, the third surface connecting an inner end of the first surface in the vehicle width direction and an outer end of the second surface in the vehicle width direction; a suspension tower positioned closer to the center of the vehicle than the apron upper member in the vehicle width direction, and the suspension tower being fixed to the apron upper member; the reinforcing member that is plate-shaped, the reinforcing member covering at least part of the second surface and at least part of the upper surface of the suspension tower, wherein a distal end of a sealer gun, which has a tubular distal end portion for injecting the molten sealer, is arranged between an outer end of the reinforcing member in the vehicle width direction and a boundary, the boundary being between the first surface and the second surface, the molten sealer being injected from the distal end of the sealer gun while the distal end of the sealer gun is facing an outside of the vehicle in the vehicle width direction.

In the above aspect, the vehicle front structure may include a fender panel that is plate-shaped, a part of the fender panel being positioned further from the center of the vehicle than the apron upper member in the vehicle width direction, and the fender panel may be curved so that an upper portion of the fender panel is directed towards the center of the vehicle in the vehicle width direction, an inner end of the fender panel in the vehicle width direction being positioned above the apron upper member and closer to the center of the vehicle than the first surface in the vehicle width direction.

According to the above aspect, the molten sealer is injected from the distal end of the sealer gun while facing the outer side in the vehicle width direction. Therefore, for example, when the fender panel is positioned on the upper side of the step part, the part of the sealer gun on its base end side hardly interferes with the fender panel and so on.

Further, when injecting the molten sealer between the step part of the apron upper member and the edge of the reinforcing member on the outer side in the vehicle width direction, flow of the molten sealer towards the outer side in the vehicle width direction is blocked by the step part. Therefore, the molten sealer flows towards the inner side in the vehicle width direction and is thus easily filled between the upper surface of the apron upper member and the lower surface of the reinforcing member. Therefore, in the vehicle front structure obtained by the sealer injection method with the foregoing configuration, it is possible to prevent insufficient sealability of a gap between the lower surface of the reinforcing member and the upper surface of the apron upper member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
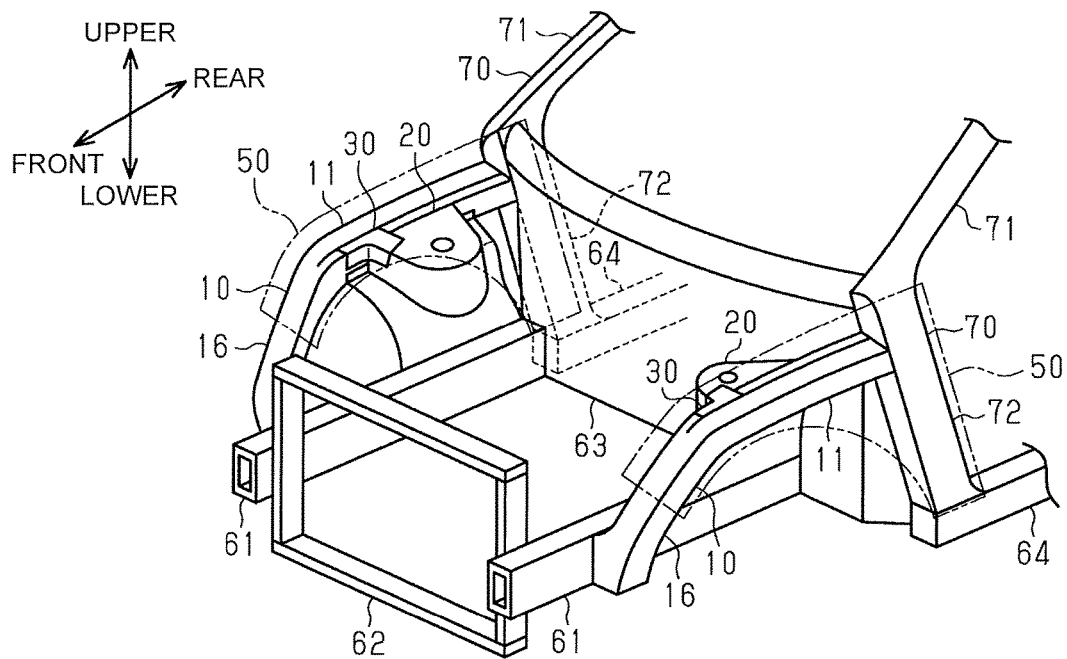
FIG. 1 is a perspective view of a vehicle front structure.

Hereinafter, an embodiment of the disclosure is explained with reference to FIG. 1 to FIG. 3. First of all, an outline of a frame structure of a vehicle front structure is given. As shown in FIG. 1, a pair of front side members 61, separated from each other in a vehicle width direction, is provided on a front side of a vehicle. The front side member 61 has a quadrangular cylindrical shape as a whole, and extends in a vehicle front-rear direction.

A radiator support 62 having a generally quadrangular frame shape is positioned between front end portions of the pair of front side members 61. Outer surfaces of the radiator support 62 in the vehicle width direction are fixed to inner surfaces of the front end portions of the front side members 61 in the vehicle width direction, respectively. Although not shown, a radiator for cooling an internal combustion engine is fixed to the radiator support 62.

Rear end portions of the front side members 61 are connected with a dash panel 63 that defines a vehicle cabin side and an engine compartment side of the vehicle. The dash panel 63 extends to outer sides of the front side members 61 in the vehicle width direction, respectively.

In end portions of the dash panel 63 on the outer sides in the vehicle width direction, front pillars 70 are positioned, which extends in an upper-lower direction as a whole. The front pillar 70 is made of a downward extending part 72, which extends along the end portion of the dash panel 63 on the outer side in the vehicle width direction, and an upwardly extending part 71, which extends upwardly from an upper edge of the downward extending part 72. The upwardly extending part 71 extends obliquely upwardly so that an upper side of the upwardly extending part is positioned on the rear side of the vehicle front-rear direction. From a lower end portion of the downward extending part 72, a rocker 64 extends towards the vehicle rear side.

As shown in FIG. 1, from the downward extending parts 72 of the front pillars 70, apron upper members 10 extend towards the vehicle front side, respectively. The apron upper members 10 are positioned on an upper side and also on the outer sides of the front side members 61 in the vehicle width direction as a whole. The apron upper member 10 includes a linear part 11, which extends linearly along the vehicle front-rear direction from the downward extending part 72, and a curved part 16 extending to the front side from a front edge of the linear part 11 while curving. The curved part 16 is curved so that its front side is directed obliquely downwardly towards the inner side in the vehicle width direction. Front end portions of the curved parts 16 are fixed to surfaces of the front end portions of the front side members 61 on the outer sides in the vehicle width direction, respectively.

As shown in FIG. 1, plate-shaped fender panels 50 extending in the upper-lower direction are positioned on the outer sides of the apron upper members 10 in the vehicle width direction, respectively. The fender panel 50 is curved so that its upper side is directed towards the inner side in the vehicle width direction. The fender panel 50 has a triangle shape as a whole in a side view from the outer side in the vehicle width direction. A rear side portion of the fender panel 50 is fixed to a surface of the downward extending part 72 of the front pillar 70 on the outer side in the vehicle width direction.

Next, configurations of the apron upper member 10 and its periphery are explained more specifically. As shown in FIG. 3, the apron upper member 10 has a generally quadrangular cylindrical shape in a sectional view orthogonal to the front-rear direction. The apron upper member 10 is made of a plate-shaped inner panel 12, which is positioned on the inner side in the vehicle width direction, and a plate-shaped outer panel 13, which is fixed to a part of the inner panel 12 on the outer side in the vehicle width direction. The inner panel 12 has a generally U-shaped section that is open on the outer side in the vehicle width direction. Specifically, the inner panel 12 includes a plate-shaped connecting wall 12$b$ extending in the upper-lower direction. An upper wall 12$a$ extends from an upper edge of the connecting wall 12$b$ towards the outer side in the vehicle width direction. The upper wall 12$a$ extends obliquely so as to go slightly upwardly towards the outer side in the vehicle width direction. A lower wall 12$c$ extends from a lower edge of the connecting wall 12$b$ towards the outer side in the vehicle width direction. The lower wall 12$c$ extends obliquely so as to go slightly downwardly towards the outer side in the vehicle width direction.

The outer panel 13 has a generally U-shaped section that is open on the outer side in the vehicle width direction. The outer panel 13 includes a plate-shaped connecting wall 13$b$ extending in the upper-lower direction. An upper wall 13$a$ extends from an upper edge of the connecting wall 13$b$ towards the outer side in the vehicle width direction. The upper wall 13$a$ extends obliquely so as to go slightly upwardly towards the outer side in the vehicle width direction. A dimension of the upper wall 13$a$ of the outer panel 13 in the vehicle width direction is smaller than that of the upper wall 12$a$ of the inner panel 12. An upper surface of the upper wall 13$a$ of the outer panel 13 is fixed to a lower surface of the upper wall 12$a$ of the inner panel 12. A lower wall 13$c$ extends from a lower edge of the connecting wall 13$b$ towards the outer side in the vehicle width direction. The lower wall 13$c$ extends obliquely so as to go slightly downwardly towards the outer side in the vehicle width direction. A dimension of the lower wall 13$c$ of the outer panel 13 in the vehicle width direction is smaller than that of the lower wall 12$c$ of the inner panel 12. A lower surface of the lower wall 13$c$ of the outer panel 13 is fixed to an upper surface of the lower wall 12$c$ of the inner panel 12.

Figure 2:
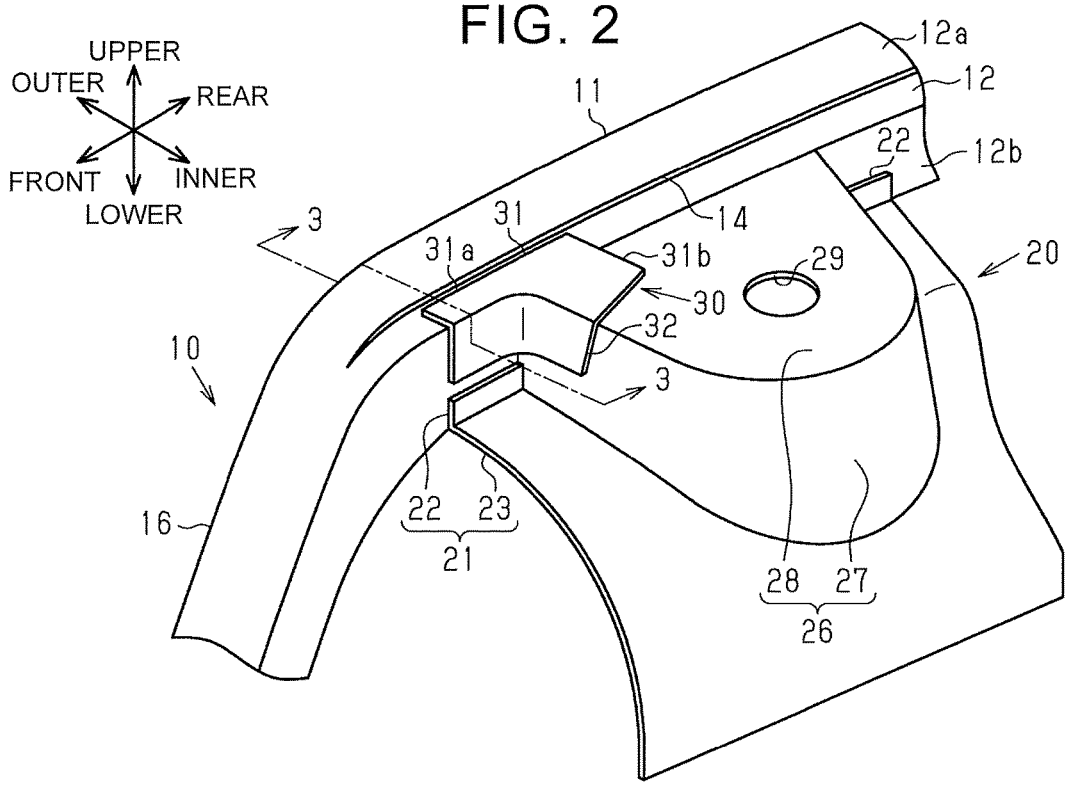
FIG. 2 is an enlarged perspective view of the vehicle front structure.

As shown in FIG. 2, a suspension tower 20, which supports a suspension and so on from the upper side, is fixed to the inner side of the linear part 11 of the apron upper member 10 in the vehicle width direction. The suspension tower 20 includes a plate-shaped wheel apron part 21, which curves downwardly towards the inner side in the vehicle width direction, and a plate-shaped bulging part 26, which bulges out upwardly from the wheel apron part 21.

An edge portion of the wheel apron part 21 on the outer side in the vehicle width direction is structured as a flange part 22 that is erected upwardly. A surface of the flange part 22 on the outer side in the vehicle width direction is fixed to a surface of the linear part 11 (the connecting wall 12$b$) on the inner side in the vehicle width direction. A curved surface part 23 extends from a lower edge of the flange part 22 towards the inner side in the vehicle width direction. The curved surface part 23 is curved so as to go downwardly towards the inner side in the vehicle width direction.

A side wall 27 of the bulging part 26 extends upwardly from the curved surface part 23 of the wheel apron part 21. In a plan view from the vehicle upper side, the side wall 27 has a U-shape that is open on the outer side in the vehicle width direction. An upper wall 28 extends from an upper edge of the side wall 27 towards the outer side in the vehicle width direction. An edge of the upper wall 28 on the outer side in the vehicle width direction reaches a surface of the linear part 11 (the connecting wall 12$b$) on the inner side in the vehicle width direction. This means that, the upper wall 28 has a generally D-shape in a plan view from the vehicle upper side. An upper surface of the upper wall 28 of the suspension tower 20 forms generally the same plane as an upper surface of the linear part 11 (the upper wall 12$a$) of the apron upper member 10. A through-hole 29, which is made in the upper-lower direction, is provided at generally at the center of the upper wall 28.

As shown in FIG. 2, a plate-shaped reinforcing member 30 is positioned on the front side of the through-hole 29 of the suspension tower 20. The reinforcing member 30 includes a lower plate part 32 extending in the upper-lower direction. The lower plate part 32 has an approximately L shape in a plan view from the vehicle upper side. A front side portion of the lower plate part 32 covers a surface of the linear part 11 (the connecting wall 12$b$) of the apron upper member 10 on the inner side in the vehicle width direction. A rear side portion of the lower plate part 32 covers a surface of the side wall 27 of the suspension tower 20 on the front side.

An upper plate part 31 extends from an upper edge of the lower plate part 32 towards the outer side in the vehicle width direction and the vehicle rear side. The upper plate part 31 has a generally L shape in a plan view from the vehicle upper side. An outer edge 31$a$, which is an edge of the upper plate part 31 on the outer side in the vehicle width direction, extends in the vehicle front-rear direction, and a rear edge 31$b$, which is an edge of the upper plate part 31 on the rear side extends in the vehicle width direction. The upper plate part 31 extends so as to cover an upper surface of the linear part 11 (the upper wall 12$a$) of the apron upper member 10, and the upper surface of the upper wall 28 of the suspension tower 20. This means that the upper plate part 31 of the reinforcing member 30 covers an area from a part of the upper surface of the apron upper member 10 (the linear part 11) on the inner side in the vehicle width direction through a part of the upper surface of the suspension tower 20 (the upper wall 28) on the outer side in the vehicle width direction. The upper plate part 31 of the reinforcing member 30 is fixed to the apron upper member 10 and the suspension tower 20 by spot welding. As shown in FIG. 3, in an area other than the portion fixed by spot welding, a lower surface of the upper plate part 31 of the reinforcing member 30 is slightly separated from the upper surface of the linear part 11

(the upper wall 12a) of the apron upper member 10 and the upper surface of the upper wall 28 of the suspension tower 20, thus making a gap.

Figure 4:
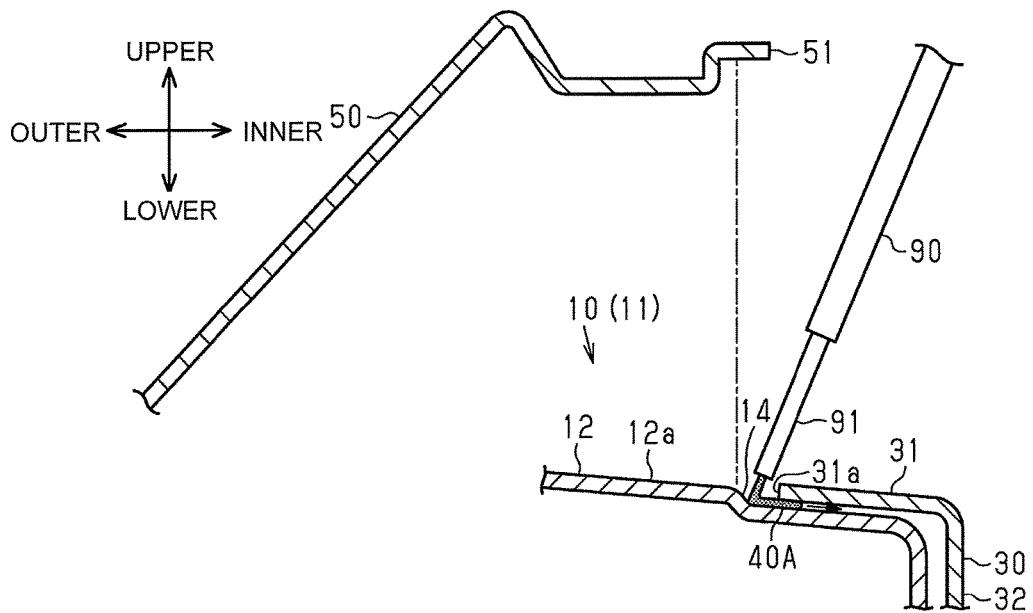
FIG. 4 is an explanatory view of a sealing method according to an embodiment.

As shown in FIG. 4, sealer 40 is filled between the upper surface of the linear part 11 (the upper wall 12a) of the apron upper member 10 and the lower surface of the upper plate part 31 of the reinforcing member 30. The sealer 40 is filled in the entire region of the outer edge 31a along the outer edge 31a of the reinforcing member 30. The sealer 40 is also filled in other edges of the reinforcing member 30 than the outer edge 31a, and in a border between the linear part 11 of the apron upper member 10 and the suspension tower 20. Thus, rainwater and so on is restrained from entering space between the reinforcing member 30 and the apron upper member 10 and between the apron upper member 10 and the suspension tower 20.

Figure 3:
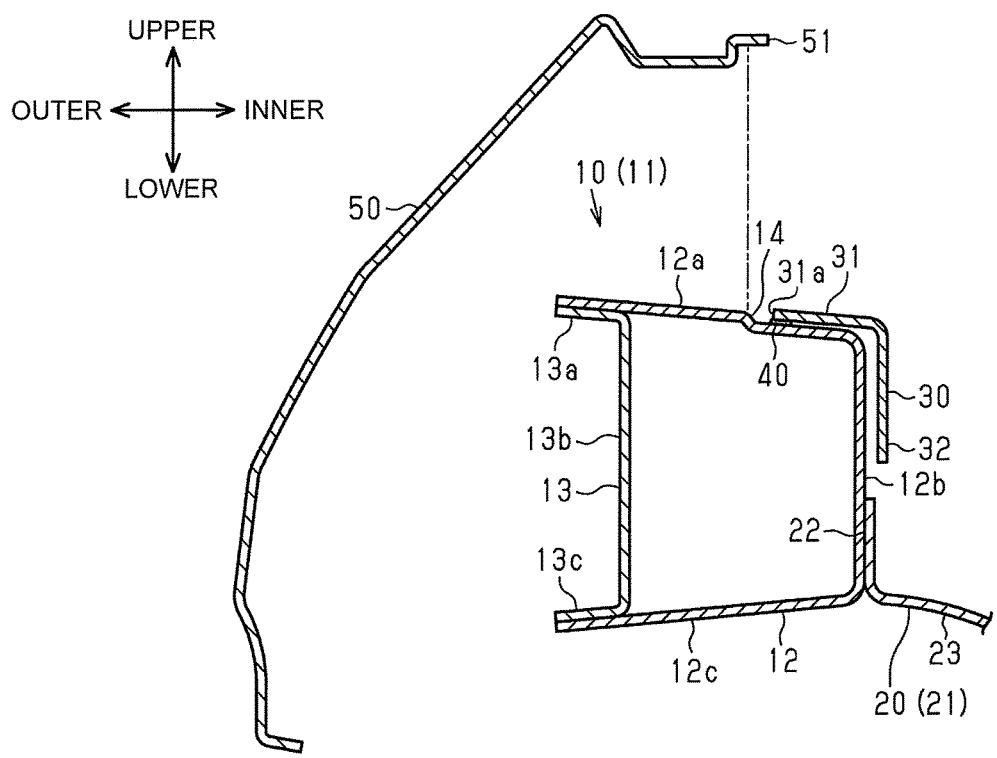
FIG. 3 is a sectional view taken along the line 3-3 in FIG. 2.

As shown in FIG. 2 and FIG. 3, a step part 14, which projects upwardly, is provided in the upper surface of the linear part 11 (the upper wall 12a) of the apron upper member 10. The upper wall 12a is curved to the upper side generally at the center in the vehicle width direction, and further curved towards the outer side in the vehicle width direction. This means that the upper wall 12a has a portion on the inner side in the vehicle width direction, and a portion on the outer side in the vehicle width direction, which is one step higher than the portion on the inner side. Then, the step part 14 is formed in the upper wall 12a at a border part between the portion on the inner side and the portion on the other side in the vehicle width direction. As shown in FIG. 2, the step part 14 extends in the vehicle front-rear direction along an extending direction of the linear part 11. The step part 14 extends in the entire region of the linear part 11 in the vehicle front-rear direction. Also, in this embodiment, a part of the step part 14 on the vehicle front side reaches a part of the curved part 16 on the rear side.

As shown in FIG. 3, the step part 14 is positioned on the outer side of the outer edge 31a of the reinforcing member 30 in the vehicle width direction. Since the step part 14 extends throughout the entire region of the linear part 11 in the vehicle front-rear direction, a part of the step part 14 is adjacent to the outer edge 31a of the reinforcing member 30. The step part 14 extends in parallel with the outer edge 31a of the reinforcing member 30 in the vehicle front-rear direction. Also, in this embodiment, in consideration of manufacturing errors of the apron upper member 10 and the reinforcing member 30, a gap is provided to some extent (for example, about several millimeters) between the step part 14 and the outer edge 31a of the reinforcing member 30.

In this embodiment, an inner end portion 51 of the foregoing fender panel 50 on the inner side in the vehicle width direction is positioned on the upper side of the linear part 11 of the apron upper member 10. The inner end portion 51 of the fender panel 50 on the inner side in the vehicle width direction is positioned on the inner side in the vehicle width direction with respect to the step part 14 of the linear part 11 of the apron upper member 10.

Figure 5:
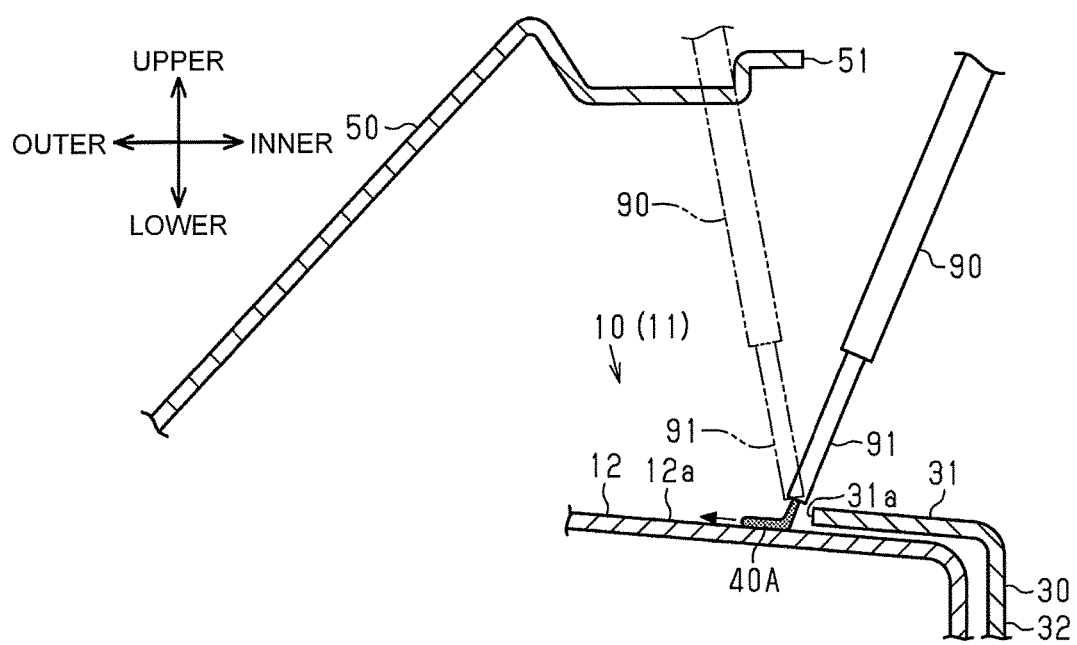
FIG. 5 is an explanatory view of a comparative example of a sealing method.

Next, a sealing method for filling the sealer 40 between the upper surface of the linear part 11 (the upper wall 12a) of the apron upper member 10 and the lower surface of the upper plate part 31 of the reinforcing member 30, and effects of the method are explained based on FIG. 4 and FIG. 5.

As shown in FIG. 4 and FIG. 5, when filling the sealer 40 between the upper surface of the linear part 11 (the upper wall 12a) of the apron upper member 10 and the lower surface of the upper plate part 31 of the reinforcing member 30, a distal end 91 of a tubular sealer gun 90 is arranged on the slightly outer side of the outer edge 31a of the reinforcing member 30 in the vehicle width direction. Then, at that position, molten sealer 40A, which is melting, is injected from the distal end 91 of the sealer gun 90 to the upper surface of the linear part 11. Further, when using the sealer gun 90 like this, it is preferred that the sealer gun 90 is arranged so that its distal end 91 faces the inner side in the vehicle width direction as shown by a two-dot chain line in FIG. 5 so that the molten sealer 40A injected from the sealer gun 90 easily flows towards the inner side in the vehicle width direction.

However, the inner end portion 51 of the fender panel 50 is positioned on the upper side of the apron upper member 10 and also close to a point vertically above the outer edge 31a of the reinforcing member 30. Hence, as shown by the two-dot chain line in FIG. 5, when one attempts to direct the distal end 91 of the sealer gun 90 towards the inner side in the vehicle width direction, a part of the sealer gun 90 on the base end side (an upper end side in FIG. 5) interferes with the fender panel 50. Therefore, the distal end 91 of the sealer gun 90 cannot be directed towards the inner side in the vehicle width direction. Therefore, in a case where the inner end portion 51 of the fender panel 50 reaches a point that is on a relatively inner side in the vehicle width direction as described above, the sealer gun 90 needs to be tilted so that the part of the sealer gun 90 on the base end side is positioned on the inner side in the vehicle width direction with respect to the inner end portion 51 of the fender panel 50. When the sealer gun 90 is arranged like this, it is highly probable that the distal end 91 of the sealer gun 90 faces the outer side in the vehicle width direction.

Here, it is assumed that the step part 14 is not provided in the upper surface of the upper wall 12a of the apron upper member 10. In such a case, as shown by a solid line in FIG. 5, when the molten sealer 40A is injected from the distal end 91 of the sealer gun 90 in a state where the distal end 91 of the sealer gun 90 faces the outer side in the vehicle width direction, the molten sealer 40A easily flows towards the outer side in the vehicle width direction on the upper surface of the linear part 11 (the upper wall 12a) of the apron upper member 10. As a result, the sealer 40 is not filled sufficiently between the upper surface of the linear part 11 (the upper wall 12a) of the apron upper member 10 and the lower surface of the upper plate part 31 of the reinforcing member 30. Thus, sealability between them becomes insufficient.

On the contrary, in the sealing method for the vehicle front structure having the foregoing configuration, as shown in FIG. 4, the distal end 91 of the tubular sealer gun 90 is arranged above the linear part 11 of the apron upper member 10 and between the outer edge 31a of the upper plate part 31 of the reinforcing member 30 and the step part 14 of the apron upper member 10. Further, the sealer gun 90 is arranged so that the part of the sealer gun 90 on the base end side does not interfere with the inner end portion 51 of the fender panel 50. Here, in the vehicle front structure having the foregoing configuration, the inner end portion 51 of the fender panel 50 is positioned on the inner side of the step part 14 of the apron upper member 10 in the vehicle width direction. Therefore, when the sealer gun 90 is arranged so as not to interfere with the inner end portion 51 of the fender panel 50, the distal end 91 of the sealer gun 90 faces the outer side in the vehicle width direction. In this state, the molten sealer 40A, which is melting, is injected from the distal end 91 of the sealer gun 90 to the upper surface of the linear part 11 (the upper wall 12a) of the apron upper member 10. The injected molten sealer 40A tries to flow in the direction in which the distal end 91 of the sealer gun 90 faces, in other words, the outer side in the vehicle width direction. However, the flow is blocked by the step part 14 of the apron upper member 10. As stated above, since the flow towards the outer side in the vehicle width direction is blocked, the molten sealer 40A flows in the vehicle front-rear direction along the outer edge 31a of the reinforcing member 30, and to the inner side in the vehicle width direction from between the step part 14 and the outer edge 31a of the reinforcing member 30. Then, the molten sealer 40A flows into space between the upper surface of the linear part 11 (the upper wall 12a) of the apron upper member 10 and the lower surface of the upper plate part 31 of the reinforcing member 30 and then get cured, thus turning into the sealer 40. In this way, the sealer 40 is filled between the upper surface of the linear part 11 (the upper wall 12a) of the apron upper member 10 and the lower surface of the upper plate part 31 of the reinforcing member 30.

Next, effects of this embodiment are explained. (1) In this embodiment, when the molten sealer 40A is injected between the outer edge 31a of the upper plate part 31 of the reinforcing member 30 and the step part 14 of the apron upper member 10, a flow of the molten sealer 40A towards the outer side in the vehicle width direction is blocked by the step part 14 on the upper surface of the linear part 11 (the upper wall 12a) of the apron upper member 10. Then, even if the molten sealer 40A tries to flow towards the outer side in the vehicle width direction, the molten sealer 40A flows towards the inner side in the vehicle width direction. Because of this, the sealer 40 is easily filled between the upper surface of the linear part 11 (the upper wall 12a) of the apron upper member 10 and the lower surface of the upper plate part 31 of the reinforcing member 30. As a result, it is possible to avoid insufficient sealability between the upper surface of the linear part 11 (the upper wall 12a) of the apron upper member 10 and the lower surface of the upper plate part 31 of the reinforcing member 30.

(2) Also, in the case where the inner end portion 51 of the fender panel 50 reaches a point on the inner side of the step part 14 in the vehicle width direction, when filling the molten sealer 40A between the upper surface of the linear part 11 (the upper wall 12a) of the apron upper member 10 and the lower surface of the upper plate part 31 of the reinforcing member 30, it is highly probable that the distal end 91 of the sealer gun 90 faces the outer side in the vehicle width direction. This means that the structure of the apron upper member 10 and the fender panel 50 according to this embodiment are the structures that make it hard to fill the sealer 40 between the upper surface of the linear part 11 (the upper wall 12a) of the apron upper member 10 and the lower surface of the upper plate part 31 of the reinforcing member 30. Therefore, using the configuration related to the step part 14 in such structures is especially preferred in order to ensure more reliable sealability of the gap between the upper surface of the linear part 11 (the upper wall 12a) of the apron upper member 10 and the lower surface of the upper plate part 31 of the reinforcing member 30.

In other words, in this embodiment, the step part 14 ensures that the molten sealer 40A is filled in the gap between the upper surface of the linear part 11 (the upper wall 12a) of the apron upper member 10 and the lower surface of the upper plate part 31 of the reinforcing member 30. Therefore, in the process of sealing the vehicle front structure, the distal end 91 of the sealer gun 90 does not need to face the inner side in the vehicle width direction. Therefore, by arranging the distal end 91 of the sealer gun 90 so as to face the outer side in the vehicle width direction, the base end side portion of the sealer gun 90 does not interfere with the fender panel 50 and other members.

(3) Incidentally, when an object collides with a vehicle from the front side, a load from the front side is applied to a front end portion of the front side member 61. Then, a load from the vehicle front side also acts on the linear part 11 of the apron upper member 10. If the sectional shape of the linear part 11 of the apron upper member 10, which is the quadrangular cylindrical shape, is collapsed, the apron upper member 10 is more likely to bend and so on, starting from the collapsed part.

Here, in this embodiment, the step part 14 extends in the entire region of the linear part 11 in the vehicle front-rear direction along the extending direction of the linear part 11. This means that a ridgeline extending in the extending direction of the linear part 11 is formed in the entire linear part 11 of the apron upper member 10 in the vehicle front-rear direction. Accordingly, compared to a structure where the step part 14 (ridgeline) is not provided, it is less likely that the sectional shape of linear part 11, which is the quadrangular cylindrical shape, is collapsed. As a result, it is possible to improve rigidity of the linear part 11 of the apron upper member 10 against a load from the vehicle front side.

The foregoing embodiment may be changed as follows. ●
In the foregoing embodiment, the step part 14 extends in the entire region of the linear part 11 in the vehicle front-rear direction. However, the step part 14 may be provided in a part of the linear part 11 in the extending direction as long as the step part 14 is positioned along the outer edge 31a of the reinforcing member 30.

In the foregoing embodiment, the step part 14 extends along the extending direction (the vehicle front-rear direction) of the linear part 11, but the disclosure is not limited to this. For example, when the step part 14 extends from the rear side to the front side in the vehicle front-rear direction, the step part 14 may extend obliquely with respect to the extending direction of the linear part 11. In such a case, the step part 14 is able to restrain the molten sealer 40A from flowing towards the outer side in the vehicle width direction.

In the foregoing embodiment, the step part 14 is made by curving the upper wall 12a upwardly, but the disclosure is not limited to this. For example, a separate plate-shaped member may be stuck on the upper surface of the upper wall 12a. In this case, since an upper surface of the foregoing "separate plate-shaped member" is positioned above the upper surface of the linear part 11 of the apron upper member 10, it is also possible to provide a step part in a border portion between them.

Also, a step part may be formed in the upper wall 12a by providing a projecting portion that is a part of the upper wall 12a projecting upwardly. In this case, it is also possible to provide a step part in the upper wall 12a in a boarder part between a part where the projecting portion is provided and a part where the projecting portion is not provided.

In the foregoing embodiment, the apron upper member 10 includes, but not limited to, the linear part 11 and the curved part 16. For example, the entire apron upper member 10 may extend linearly or the entire apron upper member 10 may be curved. When the entire apron upper member 10 is curved, it is only necessary to provide the step part 14 in the curved upper surface of the apron upper member 10.

In the foregoing embodiment, the apron upper member 10 has, but not limited to, a generally quadrangular cylindrical shape. For example, the apron upper member 10 may have a generally cylindrical shape. In such a case, it is only necessary to provide a step part, which projects upwardly, in an upper surface of the apron upper member 10.

In the foregoing embodiment, a gap is provided between the step part 14 and the outer edge 31a of the reinforcing member 30. However, it is possible to change a size of the gap between the step part 14 and the outer edge 31a of the reinforcing member 30. In this case, if there is no other member interposed between the step part 14 and the outer edge 31a of the reinforcing member 30 on the upper surface of the apron upper member 10, it is still considered that the step part 14 is adjacent to the outer edge 31a of the reinforcing member 30.

In the foregoing embodiment, the apron upper member 10 is made of the inner panel 12 and the outer panel 13. However, the apron upper member 10 may be made by bending a single plate material, or the apron upper member 10 may be made by combining three or more plate materials.

The shape of the reinforcing member 30 may be changed as appropriate. For example, out of the upper plate part 31 and the lower plate part 32 that structure the reinforcing member 30, the lower plate part 32 may be omitted. Further, the upper plate part 31 of the reinforcing member 30 has, but not limited to, a generally L shape. The shape of the upper plate part 31 may be changed as appropriate as long as the upper plate part 31 of the reinforcing member 30 covers an area from a part of the upper surface of the apron upper member 10 (the linear part 11) on the inner side in the vehicle width direction through a part of the upper surface of the suspension tower 20 (the upper wall 28) on the outer side in the vehicle width direction.

In the foregoing embodiment, the sealer 40 is filled in, but not limited to, the entire region of the outer edge 31a of the reinforcing member 30. For example, the sealer 40 may be filled in only a part of the outer edge 31a of the reinforcing member 30 when an area that needs to be filled with the sealer 40 is only a part of the gap between the upper surface of the linear part 11 (the upper wall 12a) of the apron upper member 10 and the lower surface of the upper plate part 31 of the reinforcing member 30. In this case, the step part 14 may be provided at only a position on the outer side in the vehicle width direction with respect to the outer edge 31a, where the sealer 40 is filled.

In the foregoing embodiment, the inner end portion 51 of the fender panel 50 is positioned on the inner side in the vehicle width direction with respect to the step part 14 of the linear part 11 of the apron upper member 10, but may also be positioned on the outer side in the vehicle width direction with respect to the step part 14. In this case, it could be possible to inject the molten sealer 40A while directing the distal end 91 of the sealer gun 90 to the inner side in the vehicle width direction. However, depending on injection pressure of the molten sealer 40A injected from the distal end 91 of the sealer gun 90 and viscosity of the molten sealer 40A, the molten sealer 40A can still flow towards the outer side in the vehicle width direction. Therefore, it is still effective to provide the step part 14 in the above configuration.

Further, in a case where, in addition to the fender panel 50, another member is positioned above and on the inner side of the apron upper member 10 in the vehicle width direction, the sealer gun 90 could interfere with the member, making it impossible to direct the distal end 91 of the sealer gun 90 to the inner side in the vehicle width direction. In such a case, it is also effective to provide the step part 14 according to the foregoing embodiment.

The shape and component structure of the suspension tower 20 may be changed as appropriate. For example, in the foregoing embodiment, the bulging part 26 bulges out from the wheel apron part 21 of the suspension tower 20. However, the wheel apron part 21 and the bulging part 26 may structure the suspension tower 20 as separate components.

In the foregoing embodiment, the upper surface of the upper wall 28 of the suspension tower 20 and the upper surface of the linear part 11 (the upper wall 12a) of the apron upper member 10 form generally the same plane, but may be displaced from each other in the upper-lower direction. In this case, the shape of the upper plate part 31 of the reinforcing member 30 may be changed as appropriate so as to cover an area from a part of the upper surface of the apron upper member 10 (the linear part 11) on the inner side in the vehicle width direction through a part of the upper surface of the suspension tower 20 (the upper wall 28) on the outer side in the vehicle width direction.

What is claimed is:

1. A vehicle front structure comprising:
    an apron upper member extending to a front side from a rear side in a vehicle front-rear direction in a vehicle front portion, an upper surface of the apron upper member including
        a first surface along an extending direction of the apron upper member,
        a second surface adjacent to the first surface located closer to a center of a vehicle in a vehicle width direction, and
        a third surface,
    a height of the second surface being lower than a height of the first surface, the third surface connecting an inner end of the first surface in the vehicle width direction and an outer end of the second surface in the vehicle width direction;
    a suspension tower positioned closer to the center of the vehicle than the apron upper member in the vehicle width direction, and the suspension tower being fixed to the apron upper member;
    a reinforcing member that is plate-shaped, the reinforcing member covering at least part of the second surface and at least part of an upper surface of the suspension tower; and
    sealer that is filled between the apron upper member and the reinforcing member.

2. The vehicle front structure according to claim 1, wherein
    an outer end of the reinforcing member in the vehicle width direction extends along a boundary between the first surface and the second surface.

3. The vehicle front structure according to claim 1, wherein
    the sealer is filled between the second surface and the reinforcing member.

4. The vehicle front structure according to claim 1, further comprising
    a fender panel that is plate-shaped, a part of the fender panel being positioned further from the center of the vehicle than the apron upper member in the vehicle width direction, the fender panel being curved so that an upper portion of the fender panel is directed towards the center of the vehicle in the vehicle width direction, and an inner end of the fender panel in the vehicle width direction being positioned above the apron upper member and closer to the center of the vehicle than the first surface in the vehicle width direction.

5. The vehicle front structure according to claim 1, wherein
    the apron upper member includes a tubular linear part, which linearly extends from the rear side to the front side in the vehicle front-rear direction, and a tubular curved part, which curves and extends from a front end of the linear part, and the first surface and the second surface extend in an entire region of the linear part along an extending direction of the linear part.

6. A sealing method comprising filling molten sealer, for a vehicle front structure, between an apron upper member and a reinforcing member, the vehicle front structure including:

the apron upper member extending to a front side from a rear side in a vehicle front-rear direction in a vehicle front portion, an upper surface of the apron upper member including a first surface along an extending direction of the apron upper member, a second surface adjacent to the first surface located closer to a center of a vehicle in a vehicle width direction, and a third surface, a height of the second surface being lower than a height of the first surface, the third surface connecting an inner end of the first surface in the vehicle width direction and an outer end of the second surface in the vehicle width direction;

a suspension tower positioned closer to the center of the vehicle than the apron upper member in the vehicle width direction, and the suspension tower being fixed to the apron upper member;

the reinforcing member that is plate-shaped, the reinforcing member covering at least part of the second surface and at least part of an upper surface of the suspension tower, wherein a distal end of a sealer gun, which has a tubular distal end portion for injecting the molten sealer, is arranged between an outer end of the reinforcing member in the vehicle width direction and a boundary, the boundary being between the first surface and the second surface, the molten sealer being injected from the distal end of the sealer gun while the distal end of the sealer gun is facing an outside of the vehicle in the vehicle width direction.

7. The sealing method according to claim 6, wherein the vehicle front structure includes a fender panel that is plate-shaped, a part of the fender panel being positioned further from the center of the vehicle than the apron upper member in the vehicle width direction, the fender panel is curved so that an upper portion of the fender panel is directed towards the center of the vehicle in the vehicle width direction, an inner end of the fender panel in the vehicle width direction being positioned above the apron upper member and closer to the center of the vehicle than the first surface in the vehicle width direction.

\* \* \* \* \*

UNITED STATES PATENT AND TRADEMARK OFFICE
CERTIFICATE OF CORRECTION

PATENT NO. : 10,435,079 B2
APPLICATION NO. : 15/902598
DATED : October 8, 2019
INVENTOR(S) : Takahiro Fukuoka Page 1 of 1

It is certified that error appears in the above-identified patent and that said Letters Patent is hereby corrected as shown below:

On the Title Page

Item (30), the Foreign Application Priority Data has been omitted. Item (30) should read:
--(30) Foreign Application Priority Data
Feb. 24, 2017   (JP)........................ 2017-033274--

Signed and Sealed this
Twenty-sixth Day of November, 2019

Andrei Iancu
*Director of the United States Patent and Trademark Office*